United States Patent [19] | [11] 4,066,379
Prohaska | [45] Jan. 3, 1978

[54] ROTARY TOOL ASSEMBLY HAVING REMOVABLE WORKING ELEMENTS

[76] Inventor: Peter J. H. Prohaska, Rte. 5, Box 683-A, Ocala, Fla. 32670

[21] Appl. No.: 679,599

[22] Filed: Apr. 23, 1976

[51] Int. Cl.[2] .............................................. B23B 51/00

[52] U.S. Cl. ................................ 408/125; 76/108 R; 145/116 R; 273/106.5 B; 408/144; 408/232; 408/713

[58] Field of Search ............... 408/144, 211, 232, 226, 408/238, 713, 125; 279/102, 103; 145/116 R; 76/108 R, 108 A, 108 T; 30/169, 339; 403/354, 359; 273/106.5 B

[56] References Cited

U.S. PATENT DOCUMENTS

| | | | |
|---|---|---|---|
| 756,339 | 4/1904 | Down | 76/108 T |
| 764,664 | 7/1904 | Jones | 76/108 A |
| 2,681,673 | 6/1954 | Mackey | 145/116 R |
| 2,689,131 | 9/1954 | Priest | 408/713 X |
| 2,912,247 | 11/1959 | Doonan | 273/106.5 B |
| 3,854,723 | 12/1974 | Wilson | 273/106.5 B |

*Primary Examiner*—Z. B. Bilinsky
*Attorney, Agent, or Firm*—Beveridge, DeGrandi, Kline & Lunsford

[57] ABSTRACT

A drill bit or other working tool is provided with driven end segments which are removably received in longitudinal slots formed in a shank. The slots bottoms are contacted by the driven end segments to align the working tool with the shank; and, slot side walls contact the driven end segments for transmission of torque to the working tool. The working tool and shank are formed separately, then connected together, and the shank is connected to and driven by a rotary device.

9 Claims, 4 Drawing Figures

ROTARY TOOL ASSEMBLY HAVING REMOVABLE WORKING ELEMENTS

BACKGROUND AND SUMMARY OF THE INVENTION

This invention relates to a rotary tool assembly having a removable working element, and to a method of making such a rotary tool assembly.

A rotary tool such as a drill bit is customarily formed of an integral or permanently connected shank, received in a chuck which is rotated in a conventional manner by an electric motor or other means. The integral assembly adds unnecessary expense to the tool, due both to the expense of fabricating the shank and the cost of materials, the latter being particularly applicable when the tool has an integral cutting edge which requires the use of expensive materials for the entire tool. Depending upon the particular type of tool, diverse machining operations must be performed on the single piece which also adds to the manufacturing expenses.

Other existing tools, typified by the well-known socket wrenches, have utilized working elements which are removable from a shank by hexagonal or square male-female joints. However, the particular means of interconnection between the shank and the working element in such tools differs from and is in some respects less satisfactory than the particular interconnection means of the present invention.

It has also been known to provide a conical taper fit between a working element and a shank, the angle of the conical taper being selected so that the working element and the shank remains frictionally affixed, both longitudinally and rotationally, during normal use of the tool.

An object of this invention is to provide an uncomplicated, inexpensive but quite effective rotary tool assembly having a removable working element, and to a method of making such a rotary tool assembly.

The tool assembly of this invention includes a shank and a working element which is removable from and unbonded to the shank. The shank has a driven end portion which is connected to a drill or other suitable drive means, and a tool-receiving end portion to which the working element is removably connected. The tool-receiving end portion of the shank is provided with longitudinal slots, each of which has side walls and a bottom wall which is located radially outwardly from the central longitudinal axis of the shank, and the slots form a taper between them. The working element has driven end segments which are received by the slots of the shank. The driven end segments each contact the bottom wall of one of the slots to prevent radial movement between the working element and the shank; and, each of the driven end segments also contacts one of the side walls of its respective slot to receive torque delivered to the working element by the shank.

The tool-making aspect of the invention involves separate formation of a shank and a working element of the type described above, and placement of the working element or the shank to bring them into the specified relationship wherein the radially innermost surfaces of the driven end segments of the working element are received between the side walls of the respective slots and in contact with the bottom walls of the slots so that the tool is radially positioned on the shank and in torque-receiving relationship with respect to the shank.

BRIEF DESCRIPTION OF A PREFERRED EMBODIMENT OF THE INVENTION

Figure 1:
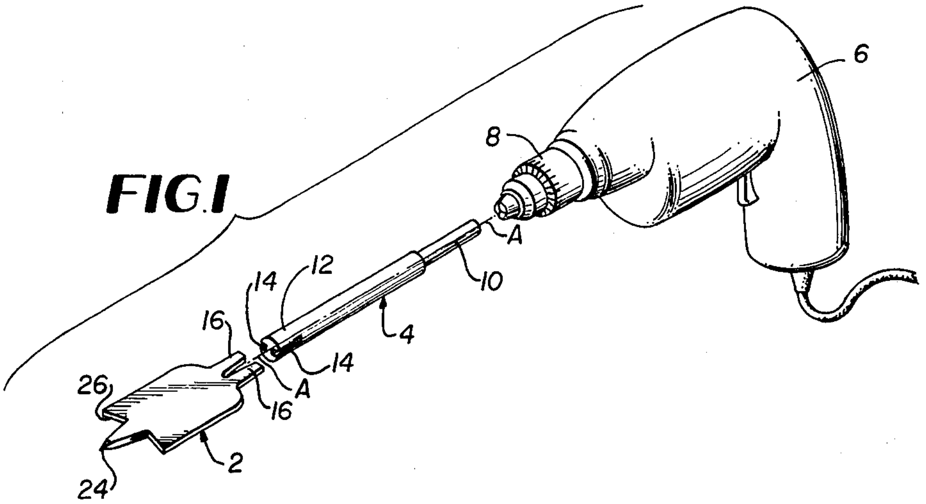
FIG. 1 is an exploded perspective view of an assembly constructed according to the invention.
Figure 2:
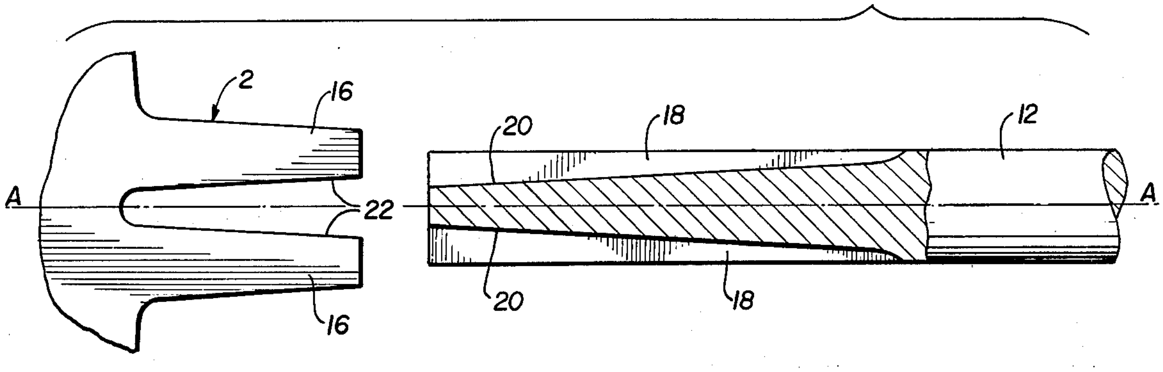
FIG. 2 is a sectional view showing the driven end segments of a working tool and the tool-receiving end portion of a shank aligned for subsequent interconnection.
Figure 3:
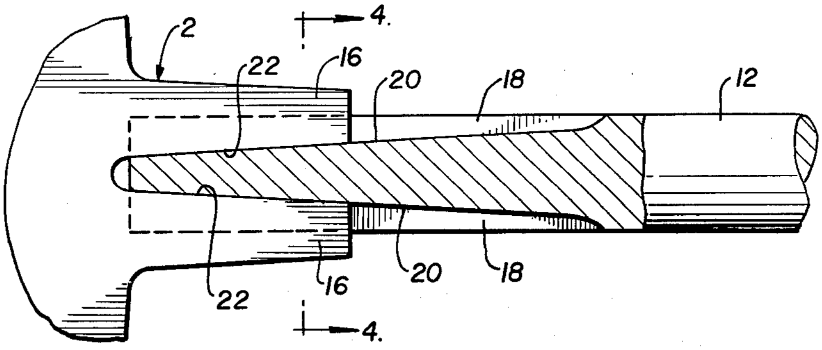
FIG. 3 shows the same elements of FIG. 2 in their interconnected positions.
Figure 4:
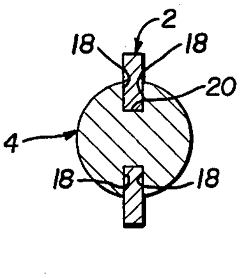
FIG. 4 is a sectional view as seen along the line 4—4 in FIG. 3.

FIG. 1 shows a wood boring bit 2 which is the working element, a shank 4, and a portable hand drill 6. The hand drill 6 is of conventional construction, being provided with a motor for rotating the chuck 8 which engages and delivers torque to the driven end 10 of the shank 4. At the tool-receiving end 12 of the shank 4, there are a pair of diametrically opposed longitudinal slots 14 which receive corresponding driven end segments 16 of the working element 2. In some cases, the slotted shank may be an integral extension of a motor shaft. As seen in FIGS. 2–4, each of the slots is provided with opposed side walls 18 and a bottom wall 20 which cooperate with the driven end segment 16 of the working element 2. The side walls of each slot are spaced apart by a constant distance which is no less than the corresponding thickness of the driven end segments 16 of the working element 2. The bottom wall 20 of each of the slots 14 is located radially outwardly of the central longitudinal axis A-A of the shank 4, and the distance between the bottom walls of the two slots 14 is not constant.

It is necessary to provide a slight taper of the bottom walls 20 to enable a frictional engagement between the shank 4 and the working element 2. Such a taper is provided by inclining the bottom wall of each of the slots at a given angle to the central longitudinal axis A—A of the shank 4, in a direction radially inward away from the driven end portion 12 of the shank. The driven end segments 16 of the working element 2 have their surfaces similarly inclined so that they will lie in contact with the bottom wall of the respective slots as shown in FIG. 3. In order to achieve satisfactory frictional engagement, it is preferred that the tangent of the angle of inclination of each bottom wall 20 of the slots, with respect to the axis A—A, be not greater than the coefficient of static friction between the shank 4 and the working element 2, this coefficient of friction being a property of the compositions and surface characteristics of the elements 2 and 4. In a preferred embodiment the arc tangent of this angle $\alpha$ is about 3° of arc.

FIG. 3 shows that the working element 2 is radially positioned by the contact of the radially innermost surface 22 of the driven end segments 16 against the bottoms 20 of the longitudinal slots 14. This relationship does not, however, provide for transmission of torque from the shank 4 to the working element 2.

Torque transmission from the shank 4 to the working element 2 is a function of the side walls 18 of the slots 14. These side walls 18 contact the faces of the working element 2, as will be seen from FIG. 4.

The invention is quite applicable to wood boring drill bits since it significantly reduces their manufacturing costs, as the individual bits may be stamped of sheet material capable of being formed into a good cutting edge, and the shanks 4 may be made of a less-expensive rod material. The illustrated wood boring drill has a tip 24 located on the axis A—A, and opposed laterally-extending cutting edges 26. However, the invention is also believed to be applicable to the other types of rotary tool assemblies including, but not limited to, metal cutting blades, socket wrenches and screwdrivers.

A complete set of wood boring bits for installation on single shank 4 may be of different sizes ranging, for example, from $\frac{1}{2}$ inch to 2 $\frac{1}{2}$ inches, in steps of $\frac{1}{8}$ or 1/16 inch.

The shank 4 needn't be forged, but may be made of a drill rod or centerless ground cold rolled steel rod stock of $\frac{3}{8}$ inch diameter in which the slots 14 are formed by a conventional milling operation. The thickness of the milling cutter and the resulting thickness of the slots may be about 0.0755 inch and the corresponding thickness of the blade may be in the range of 0.0745 to 0.0750 inch. The bottom 20 of the slot may be inclined at an angle of about 3° to the longitudinal axis A—A of the shank 4, and the minimum distance between the slot bottoms 20 may be 0.125 inch at the extreme end of the shank 4. A corresponding working element 2 has its radially innermost surfaces 22 lying at a 6° angle with respect to each other. When such a tapered slot configuration is used, the working element 2 will be held frictionally on the shank 4, but it may be removed readily by a moderate blow from a hammer or other tool.

A wood boring blade may be formed of high carbon steel, stamped and bent so that the cutting edges 26 are slightly arcuate and angularly oriented with respect to diametrical planes. The blade should be deburred and should be ground, but for wood cutting it is usually unnecessary to heat treat it.

From the foregoing, it will be appreciated that this invention provides an uncomplicated and inexpensive tool assembly which will serve effectively for many types of common tools and will result in a cost-reduction to the ultimate consumer. The invention may take many forms other than the sole embodiment shown, so it is emphasized that the invention is not related only to this embodiment but encompasses modifications and improvements thereto which fall within the scope and spirit of the following claims.

I claim:

1. A rotary tool assembly comprising a shank having a driven end portion for connection to a drive means and a tool-receiving end portion for removably receiving a working element, said shank having a plurality of longitudinal slots in said tool-receiving end portion, each of said longitudinal slots having side walls and a bottom wall which is located radially outwardly from the central longitudinal axis of the shank, said bottom wall forming an angle with the central longitudinal axis of the shank, a working element which is removable from and unbonded to the shank, said working element having a shank-receiving end provided with driven end segments removably positioned in said slot of said shank, said driven end segments each contacting the bottom wall of a respective one of said slots to prevent radial movement between the working element and the shank, said driven end segments each contacting one of said side walls of a respective one of said slots to receive torque delivered to the working element by the shank.

2. The rotary tool assembly of claim 1 wherein the working tool is a wood boring bit provided with a tip located on said longitudinal central axis, and laterally extending cutting edges.

3. The rotary tool assembly of claim 1 including means for rotating said shank to transmit torque from said side walls of the slots to said driven end segments of said working element.

4. The rotary tool assembly of claim 1 wherein the bottom wall of each of said slots is inclined at a given angle to the central longitudinal axis of the shank in a direction inwardly away from said driven end portion, and the driven end segments of the working element having surfaces inclined to said given angle in contact with the bottom wall of a respective one of said slots.

5. The rotary tool assembly of claim 4 including means for rotating said shank to transmit torque from said side walls of the slots to said driven end segments of said working element.

6. The rotary tool of claim 4 wherein the tangent of the given angle is less than the coefficient of static friction between the materials of the shank and the working element.

7. The rotary tool assembly of claim 6 wherein the working tool is a wood boring bit provided with a tip located on said longitudinal central axis, and laterally extending cutting edges.

8. The rotary tool assembly of claim 7 including means for rotating said shank to transmit torque from said side walls of the slots to said driven end segments of said working element.

9. The rotary tool assembly of claim 4 wherein the working tool is a wood boring bit provided with a tip located on said longitudinal central axis, and laterally extending cutting edges.

* * * * *